(12) United States Patent
Skvorecz (10) Patent No.: US 11,564,534 B2
(45) Date of Patent: Jan. 31, 2023

(54) ROASTING/SERVING DEVICE WITH RAISED PORTION

(71) Applicant: Robert J. Skvorecz, Kinnelon, NJ (US)

(72) Inventor: Robert J. Skvorecz, Kinnelon, NJ (US)

( * ) Notice: Subject to any disclaimer, the term of this patent is extended or adjusted under 35 U.S.C. 154(b) by 221 days.

(21) Appl. No.: 17/154,902

(22) Filed: Jan. 21, 2021

(65) Prior Publication Data

US 2022/0039606 A1 Feb. 10, 2022

Related U.S. Application Data

(63) Continuation-in-part of application No. 16/985,272, filed on Aug. 5, 2020.

(51) Int. Cl.
| | | |
|---|---|---|
| *A47J 47/14* | (2006.01) | |
| *A47J 47/02* | (2006.01) | |
| *A47J 36/24* | (2006.01) | |

(52) U.S. Cl.
CPC .......... *A47J 47/14* (2013.01); *A47J 36/2405* (2013.01); *A47J 47/02* (2013.01)

(58) Field of Classification Search
CPC ........ A47J 36/34; A47J 36/2405; A47J 47/16; A47J 47/14; A47J 47/02; B65D 7/20
See application file for complete search history.

(56) References Cited

U.S. PATENT DOCUMENTS

| | | | | | |
|---|---|---|---|---|---|
| 5,503,062 | A | * | 4/1996 | Buff, IV | A47J 36/22 220/756 |
| 6,668,708 | B1 | * | 12/2003 | Swinford | A47J 37/0694 99/449 |
| 6,952,991 | B2 | * | 10/2005 | Siegel | A47J 43/18 99/449 |
| D609,961 | S | * | 2/2010 | Bodum | D7/354 |
| D630,886 | S | * | 1/2011 | Thanasouk | D7/354 |
| 9,155,422 | B1 | * | 10/2015 | Wohld | A47J 43/18 |

* cited by examiner

*Primary Examiner* — Javier A Pagan
(74) *Attorney, Agent, or Firm* — Michael J. Feigin, Esq.; Feigin and Fridman LLC (57) ABSTRACT

A roasting/serving device has a base rack and a removably attachable raised rack. The assembled base and raised racks are held within a single pan or between a lower pan and an oppositely-oriented upper pan. The pan or pans containing the assembled base and raised racks is/are placed within a wire chafing stand with rotatable handles. The handles are rotatable to clamp together rims of the upper pan and lower pan.

20 Claims, 7 Drawing Sheets

ROASTING/SERVING DEVICE WITH RAISED PORTION

FIELD OF THE DISCLOSED TECHNOLOGY

The disclosed technology relates generally to roasting pans, and more specifically to a roasting pan which integrates with a foil pan.

SUMMARY OF THE DISCLOSED TECHNOLOGY

A roasting/serving device of embodiments of the disclosed technology has a raised portion and a base portion. The raised portion includes a pair of end wire segments with a plurality of longitudinal wire segments extending between them. Each of the longitudinal wire segments is substantially perpendicular to each of the pair of lateral wire segments.

The base portion includes an upper rectangular wire frame with a pair of longitudinal segments and a pair of transverse segments. It also has a planar wire base with a pair of longitudinal wires and a plurality of transverse wires. Each end of each of the pair of longitudinal wires extends upwardly to engage one of the transverse segments of the upper rectangular frame. "Longitudinal" and "transverse" are defined as being perpendicular with respect to each other in a horizontal plane. Transverse is further defined as "arranged along and/or extending in a direction of a substantially perpendicularly-situated line relative to another linear portion of a wire or object."

Also included in the base portion is a plurality of transverse wire supports with three connected segments. A first segment extends from one of the pair of longitudinal segments of the upper frame to and beyond one of the pair of longitudinal wires of the planar wire base. A second segment extends from an end of the first segment beneath the planar wire base, and is substantially parallel to said transverse wires of the planar wire base. A third segment extends from an end of the second segment to another of the pair of longitudinal segments of the upper frame, via another of the pair of longitudinal wires of the planar wire base. "Planar" is defined as "lying within a same plane."

The base portion further has a pair of longitudinal wire supports, each extending between the longitudinal wires of the planar wire base adjacent to, and substantially perpendicular to, the transverse segments of the upper rectangular wire frame. "Support" is defined as "a piece which bears weight of an other piece" and/or "a piece which lies on a base plane such that upper portions are held there-above."

A gauge of wires in the raised portion is equal to a gauge of wires in the base portion.

In various embodiments of the disclosed technology, the longitudinal wire segments of the raised portion are substantially linear, such that the raised portion is substantially planar. In other embodiments, each of the longitudinal wire segments of the raised portion includes a plurality of obtuse angles, such that a central section thereof is raised relative to end sections thereof, and a plane including the central sections of the longitudinal wire segments is raised relative to a plane of the end wire segments of the raised portion.

The bottom portion and top portion may be sized and configured to fit within a pan.

In various embodiments, the base portion further includes four locking protrusions formed on each end of each of the longitudinal wires of the planar wire base. Each locking protrusion may be formed on one of the ends of the longitudinal wires of the planar wire base, between one of the transverse segments of the upper rectangular wire frame and one of the transverse supports. A distance between each locking protrusion and a transverse support adjacent thereto is substantially equal, in some embodiments, to a width of the end wire segments of the raised portion.

Described differently, a kit includes the roasting/serving device described above and at least one pan, suitably sized to receive the raised portion and the base portion of the roasting/serving device. In some embodiments, the at least one pan is a lower pan and an upper pan, with the lower pan being sized to receive the base portion of the roasting/serving device and the upper pan being to be placed above the lower pan and to enclose the raised portion of the roasting/serving device therein.

The kit may further include a carrying base disposed beneath the pan, including an upper frame wire and a pair of handles. Each of the handles, in various embodiments of the disclosed technology, includes a single wire having a line of symmetry. Either side of a first linear portion of the single wire terminates in a right angle bend, forming a transverse portion on either side of the first linear portion. Each of the transverse portions terminates in two oppositely-oriented coplanar bends.

"Line of symmetry" is defined as "an axis which passes through a substantial midpoint of the single wire and divides the wire into substantially or exactly (as is considered so in the art) identical halves." Linear is defined as "arranged along and/or extending in a direction of a substantially or exactly (as is considered so in the art) straight line, e.g. without bending in any Euclidean plane." Right angle is defined as "an angle substantially equal to, or equal to (as is considered so in the art), 90 degrees."

An exterior bend of the two oppositely-oriented coplanar bends is disposed further from the first linear portion, and is smaller than an interior bend of the two oppositely-oriented coplanar bends. The exterior bend, in some embodiments, is rotatable about the upper frame wire. When the upper and lower pans are situated above the upper frame wire and the handle is rotated upwards with respect to a resting position thereof, the interior bend clamps rims of the upper and lower pan together.

"A portion terminating" is defined as "a portion of the single wire meeting a different portion of the single wire forming a unitary or continuous structure thereof." For example, a portion terminating can be. a point where the first linear portion meets the two right angles bends, a point where the transverse section meets the interior bend, and/or a the point where the exterior bend meets the second linear portion." "Termination" is defined as "a tip where the second linear portion ends and/or the tip where a longest planar length of the single wire ends." Bend is defined as "a substantially fixed curvilinear region." Rotatable is defined as "capable of being rotated around a line in a forward and backward direction at least 100 times while remaining functional."

Further described differently, a kit of embodiments of the disclosed technology includes a wire chafing stand, a base rack, a raised rack, and at least two rotatable handles. The wire chafing stand includes a rectangular top wire with two substantially parallel transverse portions and two substantially parallel longitudinal portions, each of these portions being connected by a curved portion, as well as a plurality of lower supports.

The base rack has an upper rectangular wire, similar to the upper rectangular wire of the wire chafing stand, and a lowered, substantially planar section with a plurality of substantially parallel transverse wires. Similar is defined as "having a substantially shape as and having a different size than."

The raised rack has a pair of substantially parallel and substantially planar transverse wires, with a plurality of substantially parallel longitudinal wires extending between the transverse wires thereof.

Each of the at least two rotatable handles includes a single wire having a line of symmetry. Either side of a first linear portion of the single wire terminates in a right angle bend, forming a transverse portion on either side of the first linear portion. Each of the transverse portions terminates in two oppositely-oriented coplanar bends.

In some embodiments, the longitudinal wires of the raised portion are substantially linear in a horizontal plane and a vertical plane, such that the raised portion is substantially planar.

In other embodiments, each of the longitudinal wires of the raised portion includes a plurality of angles, such that a section thereof is raised relative to the transverse wires of the raised portion, and such that a plane including the raised sections of the longitudinal wire segments is raised relative to a plane of the transverse wires of the raised portion. These angles may be obtuse angles. In some embodiments, the raised portion with longitudinal wires including a plurality of angles may be deformable in a longitudinal direction. Obtuse angle is defined as "an angle equal to more than 90 degrees." "Deformable" is defined as "capable of changing its shape without breaking when pushed by typical force of human hands without the use of tools."

In various embodiments, an exterior bend of the two oppositely-oriented coplanar bends is disposed further from the first linear portion, and is smaller than an interior bend of the two oppositely-oriented coplanar bends.

The base portion may further have a pair of lower transverse wires on which the transverse wires of the raised portion are removably placed. Each of these transverse wires may have a retaining mechanism, such that the raised portion is held substantially in place relative to the base portion when the transverse wires of the raised portion are removably placed thereon.

In some embodiments, the kit also has a lower pan and an upper pan. The lower pan fits inside said wire chafing stand. When rims of the lower pan and the upper pan are pressed together and the upper pan is in an opposite orientation relative to the lower pan, the base rack and the raised upper portion fit inside a cavity therebetween.

The exterior bend, in some embodiments, is rotatable about the rectangular top wire of the wire chafing stand. When the upper and lower pans are situated above the rectangular top wire of the wire chafing stand and the handle is rotated upwards with respect to a resting position thereof, the interior bend clamps the rims of the upper and lower pan together.

The plurality of supports of the wire chafing stand may include a pair of substantially parallel longitudinal supports extending below the rectangular top wire, at least a portion thereof being substantially planar and substantially parallel to each of the two substantially parallel longitudinal portions. It may also include a pair of substantially parallel transverse supports extending below the rectangular top wire and the longitudinal supports, at least a portion thereof being substantially planar and substantially parallel to each of the two substantially parallel transverse portions.

The base portion, in some embodiments of the disclosed technology, may include a pair of substantially parallel longitudinal supports extending below the rectangular top wire, at least a portion thereof being substantially planar and substantially parallel to each of the two substantially parallel longitudinal portions. It may also include a plurality of substantially parallel transverse supports extending below the rectangular top wire and the longitudinal supports, at least a portion thereof being substantially planar and substantially parallel to each of the two substantially parallel transverse portions.

The plurality of substantially parallel transverse wire segments of the base portion, in some embodiments, extend between the substantially planar and substantially parallel portions of the longitudinal supports.

Words describing relative heights, such as "raised", "lowered", "lower", "above", and "below" refer, unless stated otherwise, to the orientation in which the device is typically used, which is, from bottom to top, as follows: wire chafing stand, lower pan, base rack, raised rack, upper pan.

Any device or step to a method described in this disclosure can comprise or consist of that which it is a part of, or the parts which make up the device or step. The term "and/or" is inclusive of the items which it joins linguistically and each item by itself.

DETAILED DESCRIPTION OF EMBODIMENTS OF THE DISCLOSED

Technology

A roasting/serving device has a base rack and a removably attachable raised rack. The assembled base and raised racks are held within a single pan or between a lower pan and an oppositely-oriented upper pan. The pan or pans containing the assembled base and raised racks is/are placed within a wire chafing stand with rotatable handles. The handles are rotatable to clamp together rims of the upper pan and lower pan.

Embodiments of the disclosed technology will become more clear in view of the following discussion of the figures.

Figure 1:
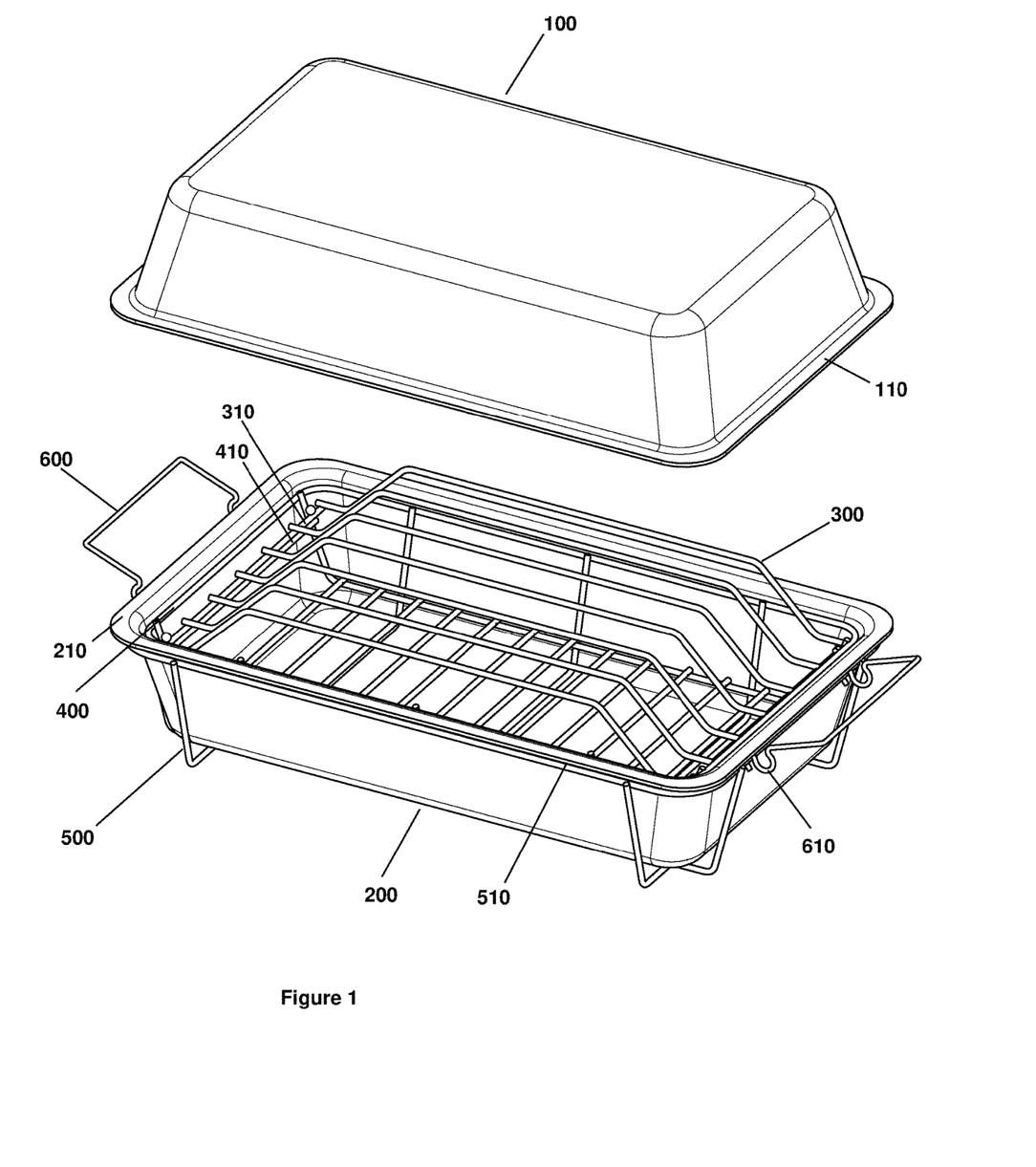
FIG. 1 is a partially-exploded perspective view of a roasting/serving device kit including an upper pan, a lower pan, a wire chafing stand with handles, a base rack, and a raised rack.

FIG. 1 is a partially-exploded perspective view of a roasting/serving device kit including an upper pan, a lower pan, a wire chafing stand with handles, a base rack, and a raised rack. The lower pan 200 fits within the wire chafing stand 500. The base rack 400 and raised rack 300 fit inside the lower pan 200, with raised rack side end segments 310 lying on base rack protruding segments 410.

The upper pan 100 is of a height such that when it is placed, in the orientation shown, such that the pan rims 110, 210 are substantially in contact with each other, the whole of base rack 400 and raised rack 300 fit within a cavity between the pans 100 and 200. The raised rack 300 is also somewhat flexible and more so than flat rack used in embodiments of the disclosed technology. That is, opposite corners are bendable and non-permanently deformable such that they are closer together above or below a horizontal plane of the raised rack. In this manner, one can place the raised 300 in a pan and/or on a base rack 400 by way of slightly deforming the raised rack and then allowing the deforming to be undone so that the raised rack in snugly (friction all corners and/or all sides) fit above the base rack or within the pan rims 110 and/or 210.

The wire chafing stand 500 has two handles 600 removably, rotatably connected thereto. Each handle has an exterior bend 620 and an oppositely-oriented interior bend 610, each of the bends being coplanar. The exterior bend 620 is sized to fit and rotate around an upper wire 510 of the wire chafing stand 500.

Figure 2:
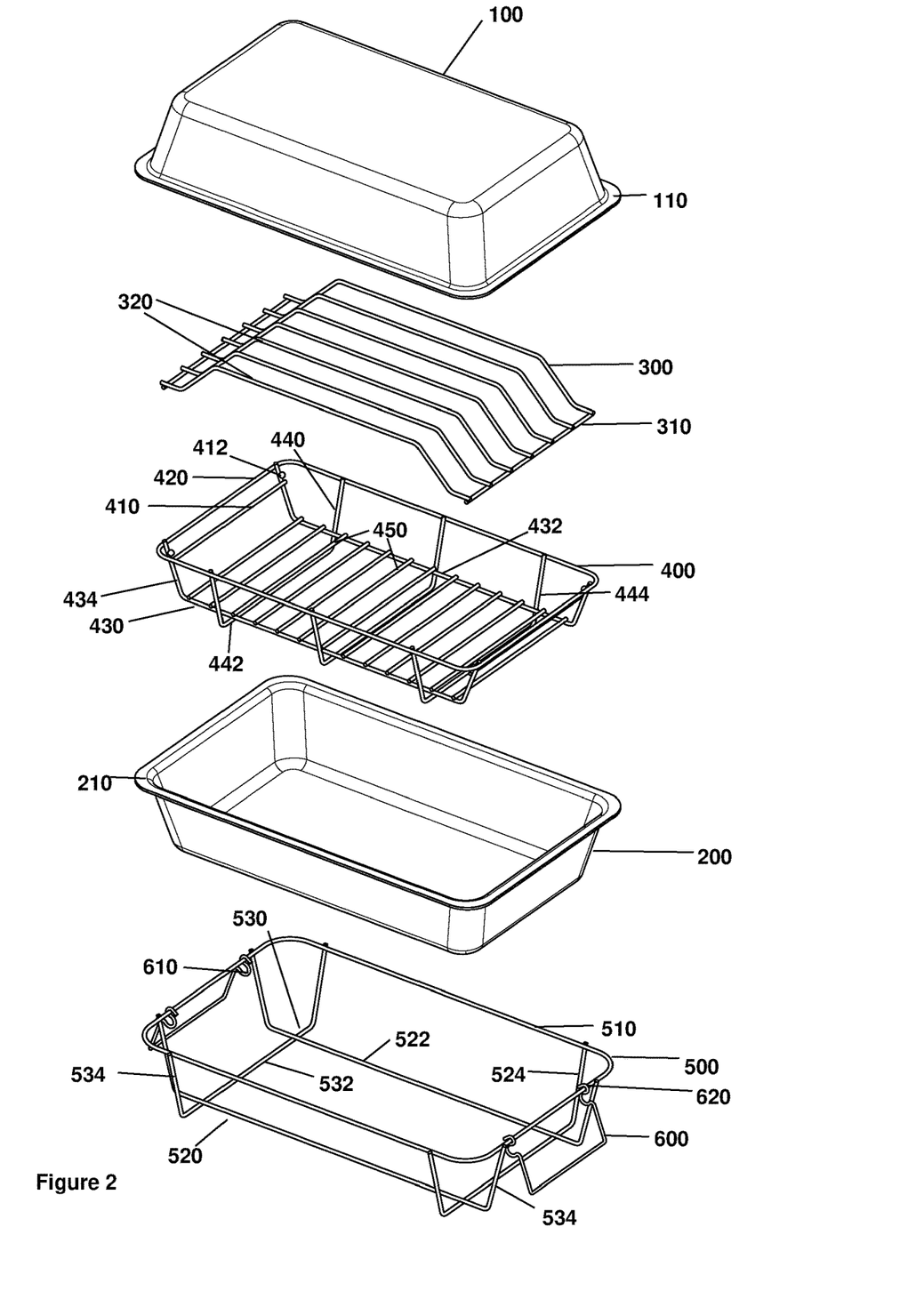
FIG. 2 is a fully-exploded perspective view of the roasting/serving device kit of FIG. 1.

FIG. 2 is a fully-exploded perspective view of the roasting/serving device kit of FIG. 1. As shown in this figure, the wire chafing stand 500 has a top wire 510 which, in some embodiments, be made of a single wire. The top wire 510 is in a shape of a rectangle with rounded corners, having two relatively longer longitudinal substantially straight portions and two relatively shorter transverse substantially straight portions.

The wire chafing stand 500, in the embodiment shown, has two longitudinal supports 520 and two transverse supports 530. Each longitudinal support 520 has a longer portion 522 and two shorter portions 524. Each of the shorter portions 524 is connected at a first end to the top wire 510 and is connected at a second end to a respective end of the longer portion 522. An angle created between a shorter portion 524 and a respective end of a respective longer portion 522 may be obtuse. The longer portions 522 are substantially parallel.

Each transverse support 530 has a longer portion 532 and two shorter portions 534. Each of the shorter portions 534 is connected at a first end to the top wire 510 and is connected at a second end to a respective end of the longer portion 532. An angle created between a shorter portion 534 and a respective end of a respective longer portion 532 may be obtuse. The longer portions 532 are substantially parallel. In the embodiment shown, the longer portions 522 of the longitudinal supports 520 are in contact with the longer portions 532 of the transverse supports 530 and are between the longer portions 532 of the transverse supports 530 and the top wire 510. In other embodiments, the longer portions 532 of the transverse supports 530 may not be in contact with the longer portions 522 of the longitudinal supports 520 and/or may be between the longer portions 522 of the longitudinal supports 520 and the top wire 510.

The base rack 400, as shown in this figure, has a top wire 420 whose shape is similar to that of the top wire 510 of the wire chafing stand 500 (as above, similar is defined as "having a substantially shape as and having a different size than").

In the embodiment shown, the base rack 400 has two longitudinal lower sections 430. Each longitudinal lower section 430 has a longer portion 432 and two shorter portions 434. Each of the shorter portions 434 is connected at a first end to the top wire 420 and is connected at a second end to a respective end of the longer portion 432. An angle created between a shorter portion 434 and a respective end of a respective longer portion 432 may be obtuse. The longer portions 432 are substantially parallel.

A plurality of transverse wire segments 450 is arranged between the two longitudinal lower sections 430. Each respective wire segment 450 is substantially parallel to and substantially equidistant from a most adjacent and/or a pair of most adjacent wire segment(s) 450 of the plurality of transverse wire segments 450. Each respective wire segment 450 has a first end thereof lying on a first longer portion 432 of a first longitudinal lower section 430 and has a second end thereof lying on a second longer portion 432 of a second longitudinal lower section 430.

A protruding bar 410 is connected at a first end to a first shorter portion 434 of a first longitudinal lower section 430 and is connected at a second end to a most-adjacent part of a nearest first shorter portion 434 of a second longitudinal lower section 430. A second protruding bar 410 is connected at a first end to a second shorter portion 434 of the first longitudinal lower section 430 and is connected at a second end to a most-adjacent part of a second shorter portion 434 of the second longitudinal lower section 430. A locking mechanism 412 is placed in the vicinity of each connection between a protruding bar 410 and a shorter portion 434 of a longitudinal lower section 430.

The base rack 400 further has three transverse supports 440. Each transverse support 440 has a longer portion 442 and two shorter portions 444. Each of the shorter portions 444 is connected at a first end to the top wire 420 and is connected at a second end to a respective end of the longer portion 442. An angle created between a shorter portion 444 and a respective end of a respective longer portion 442 may be obtuse. The longer portions 442 are substantially parallel. In the embodiment shown, the longer portions 432 of the longitudinal lower sections 430 are in contact with the longer portions 442 of the transverse supports 440 and are between the longer portions 442 of the transverse supports 440 and the top wire 420.

The raised rack 300, in the embodiment shown, has a pair of end wire segments 310 with a plurality of longitudinal wire segments 320 lying therebetween. Each of the end wire segments 310 are substantially parallel to each other. Each of the longitudinal wire segments 320 of the plurality of longitudinal wire segments is substantially parallel to each other.

Figure 3:
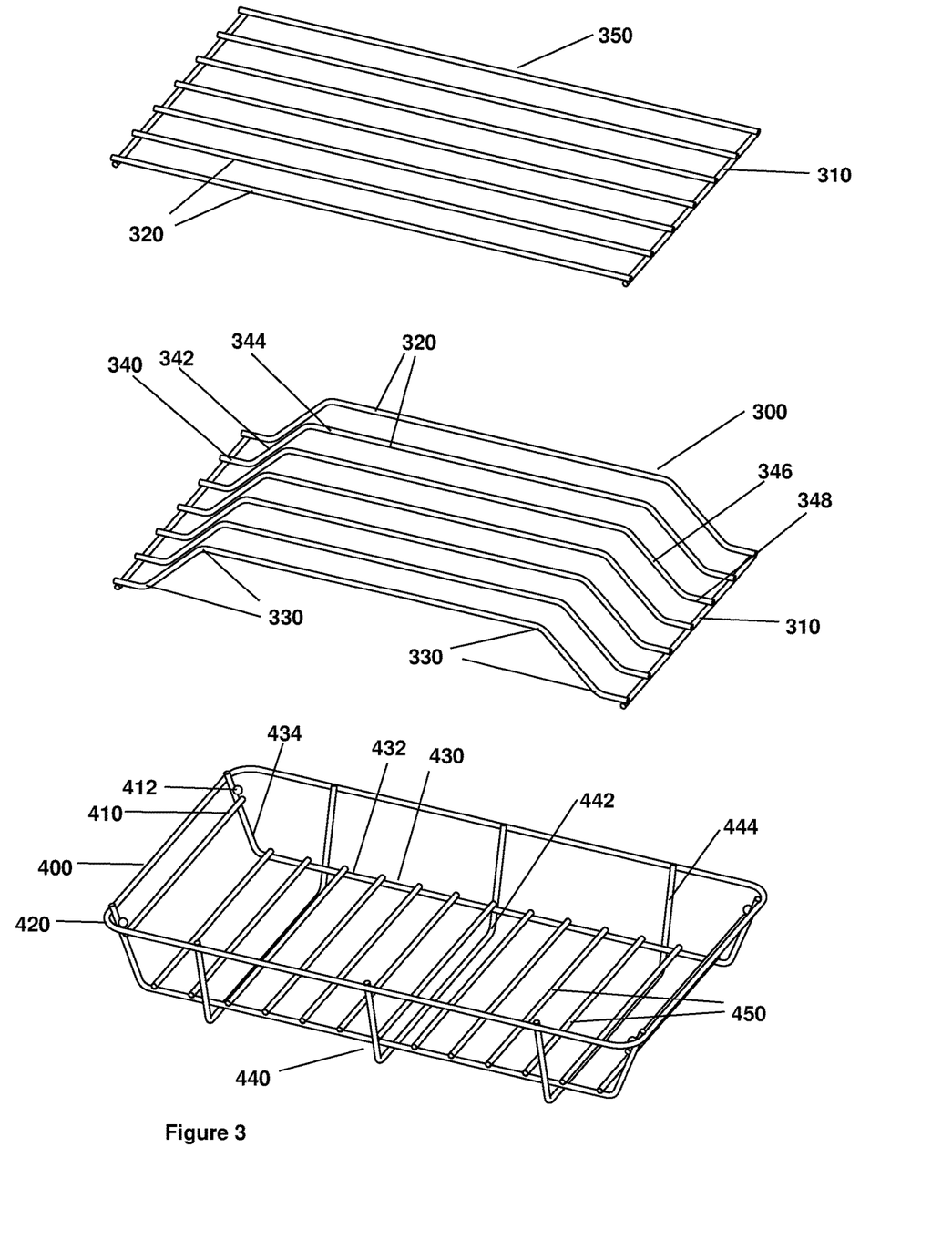
FIG. 3 is an exploded perspective view of the base rack and the raised rack of FIG. 1, and of an alternative raised rack.
Figure 4:
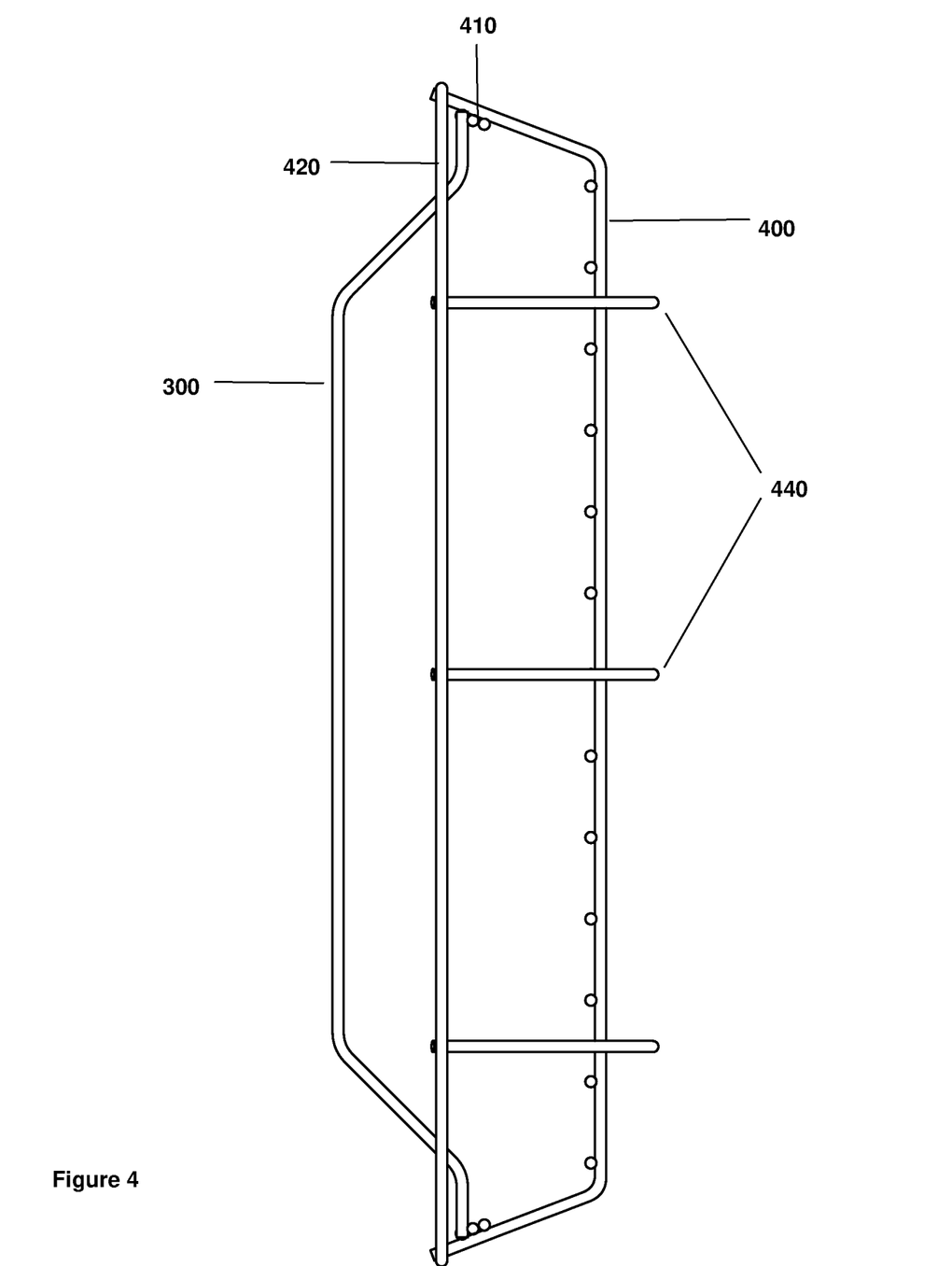
FIG. 4 is a left side view of the assembled base rack and raised rack of FIG. 1, the reverse side being a mirror image thereof.
Figure 7:
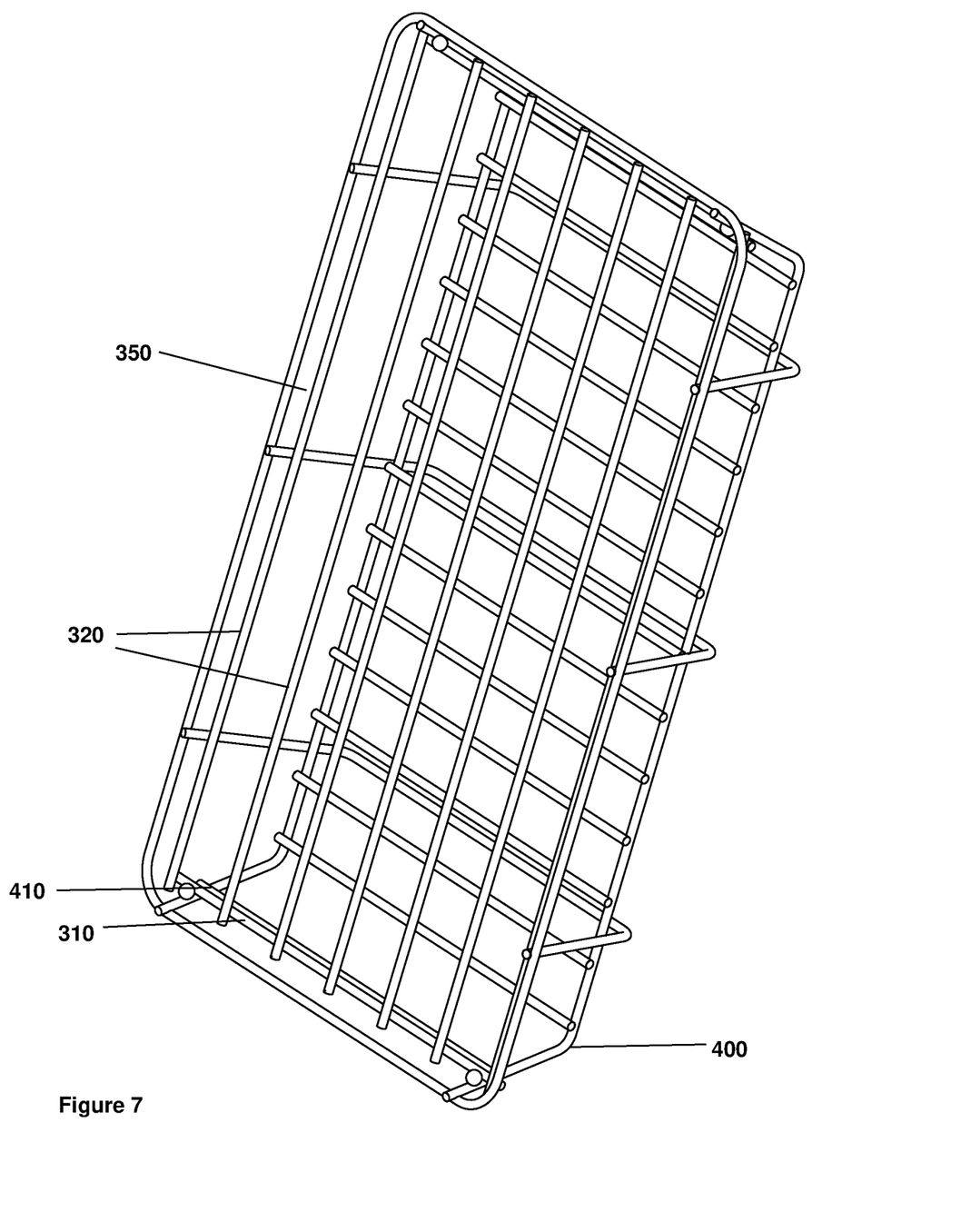
FIG. 7 is a perspective view of the assembled base portion of FIG. 1 and the alternative raised rack of FIG. 3.

FIG. 3 is an exploded perspective view of the base rack and the raised rack of FIG. 1, and of an alternative raised rack. FIG. 4 is a left side view of the assembled base rack and raised rack of FIG. 1, the reverse side being a mirror image thereof. FIG. 7 is a perspective view of the assembled base portion of FIG. 1 and the alternative raised rack of FIG. 3. The raised rack, in some embodiments, is the raised rack 300. The raised rack 300 has a plurality of longitudinal wires 320, each of which has four bends 330. An angle of each of the bends 330 may be equal.

Each longitudinal wire 320 of the raised rack 300, in the embodiment shown, has segments 340, 342, 344, 346, and 348, each of which is connected to the segment before and/or after it by way of a bend 330. The segments 340, 344, and 348 are horizontal in a vertical plane (where a horizontal plane is defined as "a plane containing all segments 340 of each of the wires 320"), and the segments 340 and 348 are coplanar. The segments 342 and 346 are tilted at equal and opposite angles relative to the horizontal plane.

The raised rack, in other embodiments, is raised rack 350. In this embodiment, each of the longitudinal wire segments 320 is substantially straight throughout. The entire raised rack 350 lies in substantially a same plane.

Each of the end wire segments 310 of the raised rack 300 or the raised rack 350 is sized to be removably held in place when placed onto a respective protruding bar 410 and held in place by a respective locking mechanism 412 of the wire chafing stand 400.

As shown in FIG. 4, when the raised rack 300 is held removably in place by protruding bars 410 and locking mechanisms 412 of the wire chafing stand 400, a distance between a most-raised segment of the raised rack 300 and the top wire 420 of the base rack 400 is smaller than a distance between the top wire 420 of the base rack 400 and a lowest portion of the transverse supports 440 of the base rack 400.

Figure 5:
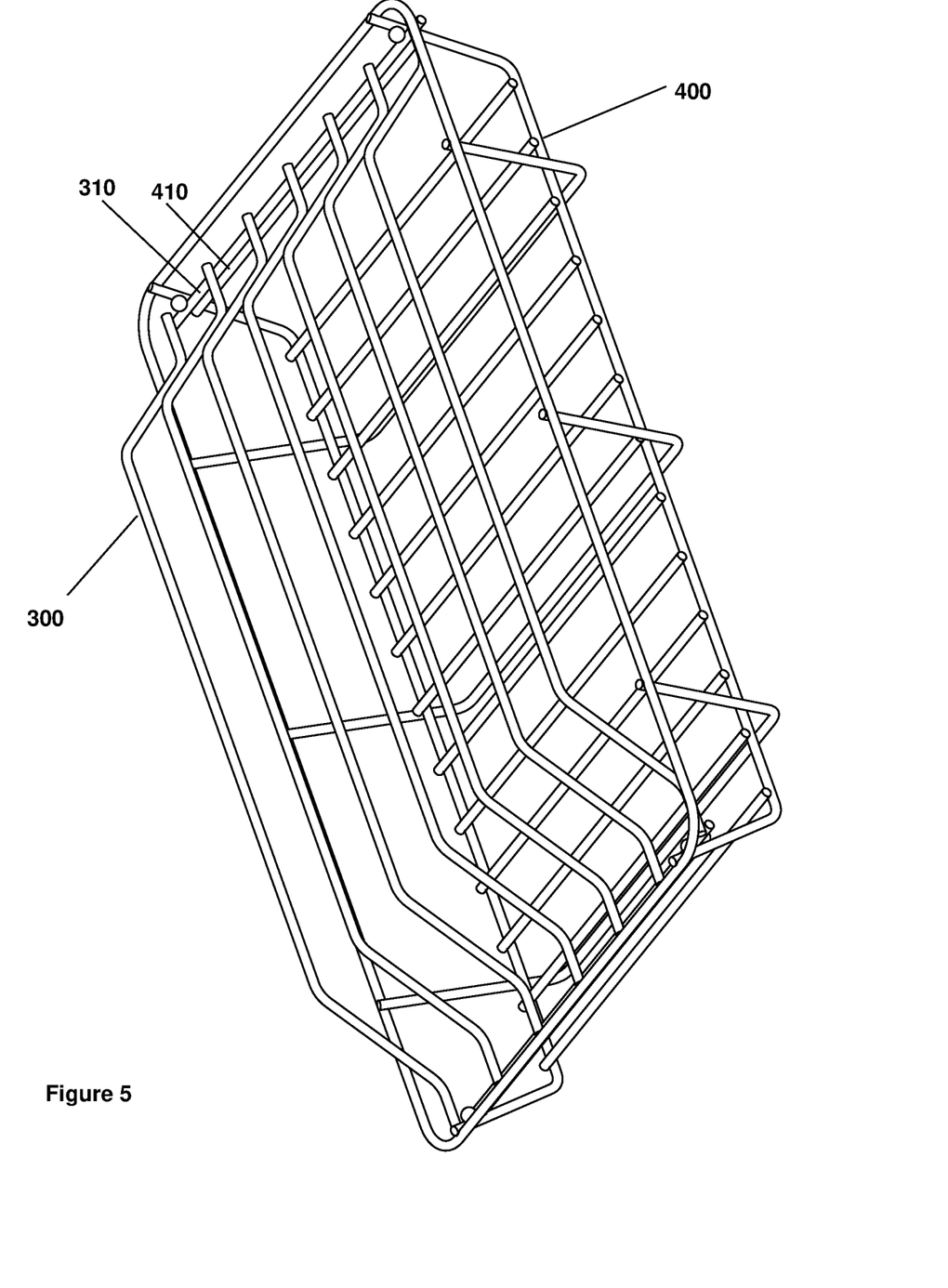
FIG. 5 is a perspective view of the assembled base rack and raised rack of FIG. 1.
Figure 6:
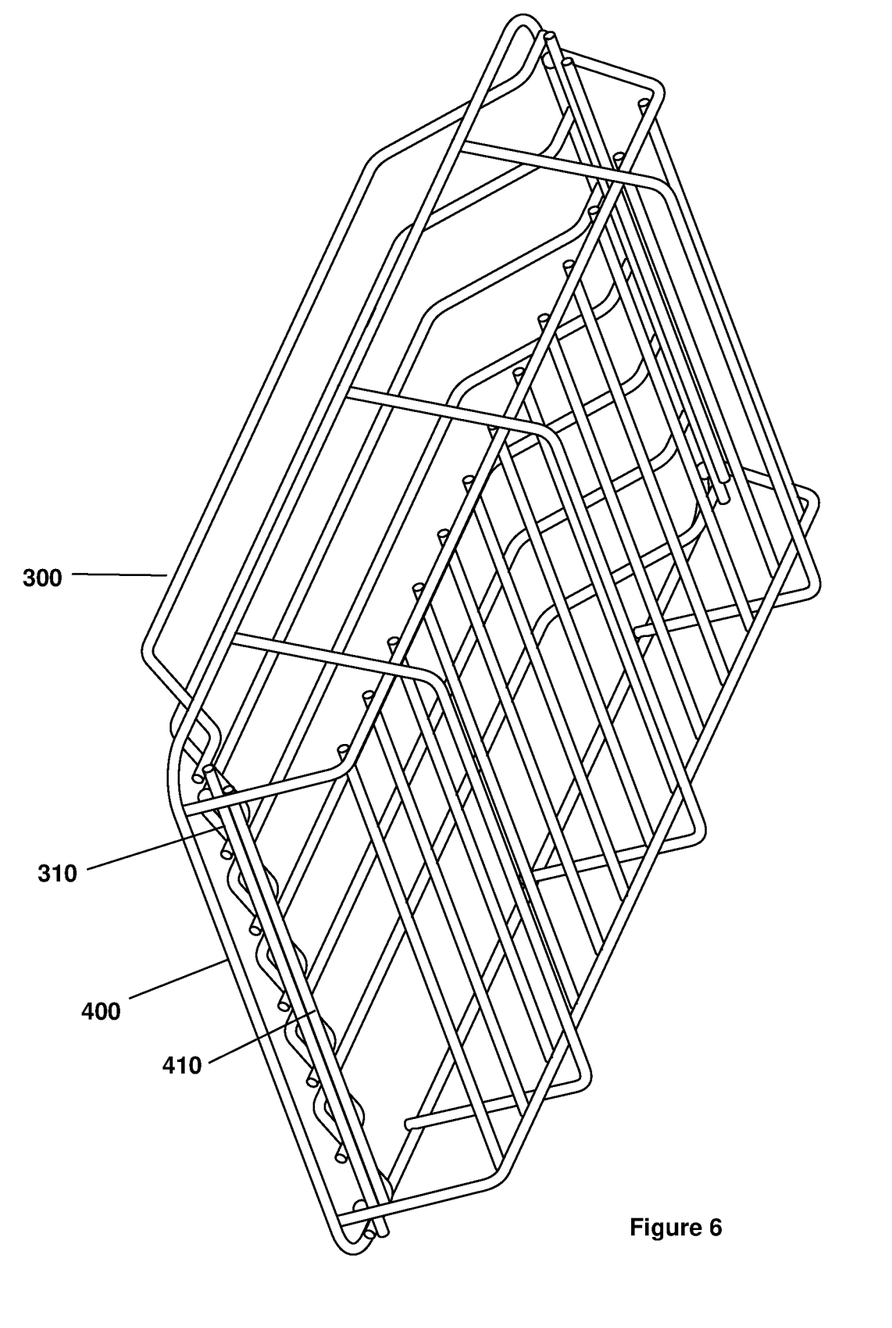
FIG. 6 is a bottom perspective view of the base rack and raised rack of FIG. 1.

FIG. 5 is a perspective view of the assembled base rack and raised rack of FIG. 1. FIG. 6 is a bottom perspective view of the base rack and raised rack of FIG. 1. As shown by these figures, a length of a transverse wire segment 310 of the raised rack 300 may be greater than a length of a respective protruding bar 410 of the base rack 400. The raised rack 300 may be resilient in a horizontal and/or in a longitudinal direction, such that it may be deformed in that direction and return to its original shape. "Resilience" is defined as "a capacity to return to its original shape after being deformed".

For purposes of this disclosure, the term "substantially" is defined as "at least 95% of" the term which it modifies.

Any device or aspect of the technology can "comprise" or "consist of" the item it modifies, whether explicitly written as such or otherwise.

When the term "or" is used, it creates a group which has within either term being connected by the conjunction as well as both terms being connected by the conjunction.

While the disclosed technology has been disclosed with specific reference to the above embodiments, a person having ordinary skill in the art will recognize that changes can be made in form and detail without departing from the spirit and the scope of the disclosed technology. The described embodiments are to be considered in all respects only as illustrative and not restrictive. All changes that come within the meaning and range of equivalency of the claims are to be embraced within their scope. Combinations of any of the methods and apparatuses described hereinabove are also contemplated and within the scope of the invention.

The invention claimed is:

1. A roasting/serving device comprising:
   a raised portion including:
      a pair of end wire segments; and
      a plurality of longitudinal wire segments extending between said end wire segments, each of said longitudinal wire segments being substantially perpendicular to each of said pair of lateral wire segments;
   a base portion including:
      an upper rectangular wire frame including a pair of longitudinal segments and a pair of transverse segments;
      a planar wire base including a pair of longitudinal wires and a plurality of transverse wires, each end of each of said pair of longitudinal wires extending upwardly to engage one of said transverse segments of said upper rectangular wire frame;
   a plurality of wire supports having a first segment extending from one of said pair of longitudinal segments of said upper frame, to and beyond one of said pair of longitudinal wires of said planar wire base, a second segment extending from an end of said first segment, substantially parallel to said transverse wires of said planar wire base, and disposed beneath said planar wire base, and a third segment extending from an end of said second segment to another of said pair of longitudinal segments of said upper frame, via another of said pair of longitudinal wires of said planar wire base; and
   a pair of longitudinal supports, each extending between said longitudinal wires of said planar wire base adjacent to, and substantially perpendicular to, said transverse segments of said upper rectangular wire frame;
   wherein a gauge of wires in said raised portion is equal to a gauge of wires in said base portion.

2. The roasting/serving device of claim 1, wherein said longitudinal wire segments of said raised portion are substantially linear, such that said raised portion is substantially planar.

3. The roasting/serving device of claim 1, wherein:
   each of said longitudinal wire segments of said raised portion includes a plurality of obtuse angles, such that a central section thereof is raised relative to end sections thereof, and
   a plane including said central sections of said longitudinal wire segments is raised relative to a plane of said end wire segments of said raised portion.

4. The roasting/serving device of claim 1, wherein said bottom portion and said top portion are sized and configured to fit within a pan.

5. The roasting/serving device of claim 1, wherein said base portion further includes four locking protrusions formed on each end of each of said longitudinal wires of said planar wire base, each locking protrusion formed on one said end of said longitudinal wires of said planar wire base between one of said transverse segments of said upper rectangular wire frame and one of said transverse supports,
   wherein a distance between each said locking protrusion and said transverse support adjacent thereto is substantially equal to a width of said end wire segments of said raised portion.

6. A kit, comprising:
   a roasting/serving device according to claim 1; and
   at least one pan, suitably sized to receive said raised portion and said base portion of said roasting/serving device.

7. The kit of claim 6, wherein said at least one pan comprises a lower pan and an upper pan, said lower pan sized to receive said base portion of said roasting/serving device, and said upper pan above said lower pan and to enclose said raised portion of said roasting/serving device therein.

8. The kit of claim 7, further comprising a carrying base disposed beneath said pan, said carrying base including an upper frame wire and a pair of handles, each of said handles including:
   a single wire having a line of symmetry;
   either side of a first linear portion of said single wire terminating in a right angle bend forming a transverse portion of said single wire on said either side of said first linear portion;
   each of said transverse portions terminating in two oppositely-oriented coplanar bends;
   an exterior bend of said two oppositely-oriented coplanar bends being disposed further from said first linear portion and being smaller than an interior bend of said two oppositely-oriented coplanar bends,
   wherein said exterior bend is rotatable about said upper frame wire and said interior bend clamps rims of said upper pan and said lower pan together, when said upper and lower pans are situated above said wire while said handle is rotated upwards with respect to a resting position thereof.

9. A kit comprising:
a wire chafing stand comprising:
  an upper rectangular top wire with two substantially parallel transverse portions and two substantially parallel longitudinal portions, each of said portions connected by a curved portion; and
  a plurality of lower supports;
a base rack comprising:
  an upper rectangular wire, having a shape similar to said upper rectangular wire of said wire chafing stand; and
  a lowered substantially planar section comprising a plurality of substantially parallel transverse wires;
a raised rack comprising:
  a pair of substantially parallel and substantially planar transverse wires; and
  a plurality of substantially parallel longitudinal wires extending between said transverse wires of said raised rack; and
at least two rotatable handles, each handle comprising:
  a single wire having a line of symmetry;
  either side of a first linear portion of said single wire terminating in a right angle bend forming a longitudinal portion of said single wire on said either side of said first linear portion;
  each of said longitudinal portions terminating in two oppositely-oriented coplanar bends.

10. The kit of claim 9, wherein said longitudinal wires of said raised portion are substantially linear in a horizontal and a vertical orientation, such that said raised portion is substantially planar.

11. The kit of claim 9, wherein:
each of said longitudinal wires of said raised portion includes a plurality of angles, such that a section thereof is raised relative to said transverse wires of said raised portion, and
a plane including said raised sections of said longitudinal wire segments is raised relative to a plane of said transverse wires of said raised portion.

12. The kit of claim 11, wherein said each angle of said plurality of angles of said raised portion is obtuse.

13. The kit of claim 11, wherein said raised portion is deformable in a longitudinal direction.

14. The kit of claim 9, wherein an exterior bend of said two oppositely-oriented coplanar bends of said handles is disposed further from said first linear portion and being smaller than an interior bend of said two oppositely-oriented coplanar bends.

15. The kit of claim 9, wherein said base portion further comprises a pair of lower transverse wires on which said transverse wires of said raised portion are removably placed.

16. The kit of claim 15, wherein each said transverse wire of said pair of lower transverse wires of said base portion further comprises a locking mechanism such that said raised portion is held substantially in place relative to the base portion when said transverse wires of said raised portion are removably placed on said lower transverse wires;
wherein said locking mechanism comprises a structure extending a distance toward an interior of said base portion such that when said transverse wires of said raised portion are inserted between said locking mechanism structures and said planar wire base of said base portion, said locking mechanism structures extend over said transverse wires of said raised portion such that said raised portion is substantially held in place while undeformed in said longitudinal direction.

17. The kit of claim 9, further comprising:
a lower pan; and
an upper pan;
wherein said lower pan fits inside said wire chafing stand; and
wherein said base rack and said raised upper portion fit inside a cavity created between said lower pan and said upper pan when rims of said lower pan and said upper pan are pressed together and said upper pan is in an opposite orientation relative to said lower pan.

18. The kit of claim 17, wherein said exterior bend of said handle is sized to rotate about said rectangular top wire of said wire chafing stand and said interior bend is sized to clamp said rims of said upper and lower pans together which are situated above said rectangular top wire of said wire chafing stand while said handle is rotated upwards with respect to a resting position thereof.

19. The kit of claim 9, wherein said plurality of lower supports of said wire chafing stand further comprises:
  a pair of substantially parallel longitudinal supports extending below said rectangular top wire, at least a portion thereof being substantially planar and substantially parallel to each of said two substantially parallel longitudinal portions; and
  a pair of substantially parallel transverse supports extending below said rectangular top wire and said longitudinal supports, at least a portion thereof being substantially planar and substantially parallel to each of said two substantially parallel transverse portions.

20. The kit of claim 9, said base rack further comprising:
  a pair of substantially parallel longitudinal supports extending below said rectangular top wire, at least a portion thereof being substantially planar and substantially parallel to each of said two substantially parallel longitudinal portions; and
  a plurality of substantially parallel transverse supports extending below said rectangular top wire and said longitudinal supports, at least a portion thereof being substantially planar and substantially parallel to each of said two substantially parallel transverse portions;
wherein said plurality of substantially parallel transverse wire segments extend between said substantially planar and substantially parallel portions of said longitudinal supports.

* * * * *